(12) United States Patent
Geurts et al.

(10) Patent No.: US 9,358,425 B2
(45) Date of Patent: Jun. 7, 2016

(54) MOTION DETECTION SYSTEM

(75) Inventors: Lucas Jacobus Franciscus Geurts, Best (NL); Johan Partomo Djajadiningrat, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 592 days.

(21) Appl. No.: 13/058,022

(22) PCT Filed: Aug. 4, 2009

(86) PCT No.: PCT/IB2009/053371
§ 371 (c)(1),
(2), (4) Date: Feb. 8, 2011

(87) PCT Pub. No.: WO2010/018485
PCT Pub. Date: Feb. 18, 2010

(65) Prior Publication Data
US 2011/0140931 A1   Jun. 16, 2011

(30) Foreign Application Priority Data

Aug. 12, 2008 (EP) .................................. 08162234

(51) Int. Cl.
| | | |
|---|---|---|
| *A63B 24/00* | (2006.01) | |
| *A63B 71/06* | (2006.01) | |
(Continued)

(52) U.S. Cl.
CPC ......... *A63B 24/0006* (2013.01); *A63B 24/0021* (2013.01); *A63B 71/0686* (2013.01);
(Continued)

(58) Field of Classification Search
CPC ............... A63B 2024/0012; A63B 2024/0003; A63B 2024/0006; A63B 2024/0009; A63B 2220/00; A63B 2220/10; A63B 2220/40; A63B 2220/44; A63B 2220/803; A63B 24/0003; A63B 24/0006; A61B 2562/0219
USPC ......................... 341/20–35; 482/1–9; 434/247
See application file for complete search history.

(56) References Cited

U.S. PATENT DOCUMENTS

| | | | |
|---|---|---|---|
| 7,179,984 B2 | 2/2007 | Nishitani et al. | |
| 7,292,151 B2 * | 11/2007 | Ferguson et al. | 340/573.1 |

(Continued)

FOREIGN PATENT DOCUMENTS

| | | |
|---|---|---|
| CN | 1731713 A | 2/2006 |
| EP | 0993845 A2 | 9/1999 |

(Continued)

OTHER PUBLICATIONS

Author: C Verplaetse, Title: Inertial Proprioceptive Devices: Self-motion Sensing toys and tools, Publisher: IBM Systems Journal, vol. 35, Nos. 2&4, 1996.*

(Continued)

*Primary Examiner* — Hai Phan
*Assistant Examiner* — Franklin Balseca

(57) ABSTRACT

A motion detection system (100) comprises a sensor (106) arranged to detect a movement pattern of a movement occasioned by a user, and a control device (108) arranged to receive movement data representative of the detected movement pattern. The control device (108) is further arranged to compare the detected movement pattern data with movement pattern data representative of a predetermined movement pattern and to determine a coherence parameter representative of the coherence between the detected and the predetermined movement pattern. The control device (108) controls a feedback device (110) for providing feedback to the user on the basis of the determined coherence parameter.

20 Claims, 2 Drawing Sheets

(51) Int. Cl.
*A63B 23/18* (2006.01)
*A63B 43/00* (2006.01)
*A63B 43/06* (2006.01)
*G06F 3/01* (2006.01)

(52) U.S. Cl.
CPC .............. *G06F3/011* (2013.01); *G06F 3/016* (2013.01); *G06F 3/017* (2013.01); *A63B 23/185* (2013.01); *A63B 24/0003* (2013.01); *A63B 43/00* (2013.01); *A63B 43/06* (2013.01); *A63B 2024/0009* (2013.01); *A63B 2024/0012* (2013.01); *A63B 2071/0625* (2013.01); *A63B 2071/0627* (2013.01); *A63B 2071/0655* (2013.01); *A63B 2220/24* (2013.01); *A63B 2220/40* (2013.01); *A63B 2220/803* (2013.01); *A63B 2230/04* (2013.01); *A63B 2230/30* (2013.01); *A63B 2230/50* (2013.01); *A63B 2230/65* (2013.01)

(56) References Cited

U.S. PATENT DOCUMENTS

| | | | | |
|---|---|---|---|---|
| 7,602,301 | B1 * | 10/2009 | Stirling et al. | 340/573.1 |
| 8,077,145 | B2 * | 12/2011 | Rosenberg et al. | 345/157 |
| 2005/0024360 | A1 | 2/2005 | Abe et al. | |
| 2005/0240086 | A1 * | 10/2005 | Akay | 600/300 |
| 2006/0022833 | A1 | 2/2006 | Ferguson et al. | |
| 2008/0015031 | A1 * | 1/2008 | Koizumi et al. | 463/43 |
| 2008/0281234 | A1 * | 11/2008 | Goris et al. | 600/595 |

FOREIGN PATENT DOCUMENTS

| | | |
|---|---|---|
| EP | 1852163 A2 | 11/2007 |
| JP | 2007296173 A | 11/2007 |
| JP | 2008506421 A | 3/2008 |
| WO | 0063874 | 10/2000 |
| WO | 0063874 A1 | 10/2000 |
| WO | WO 0063874 A1 * 10/2000 | ............ 345/168 |
| WO | 2004058059 A2 | 7/2004 |
| WO | 2005118086 A1 | 12/2005 |
| WO | 2007069127 A2 | 6/2007 |

OTHER PUBLICATIONS

Djajadiningrat et al: "Easy Doesn't Do It: Skill and Expression in Tangible Aesthetics"; Pers Ubiquit Comput (2007), vol. 11: pp. 657-676.

Farnell: "Moving Bodies, Acting Selves"; Annu. Rev. Anthropol, 1999, vol. 28, pp. 341-373.

Kabat-Zinn et al: "Effectiveness of a Meditation-Based Stress Reduction Program in the Treatment of Anxiety Disorders"; AM Journal of Psychiatry, 1992, vol. 149, pp. 936-943.

* cited by examiner

MOTION DETECTION SYSTEM

FIELD OF THE INVENTION

The present invention relates to a motion detection system. The motion detection system is capable of detecting movement or in general a movement pattern occasioned by a user.

BACKGROUND OF THE INVENTION

Motion detection systems are known in a variety of embodiments, in particular motion detection systems are known that can detect movements or movement patterns occasioned by a user and can provide some kind of interaction with the user based on the detected movements.

An example of such a system is disclosed in United States patent publication U.S. Pat. No. 7,179,984 B2. wherein a performance interface system is described that includes a motion detector provided for movement with a performer or user. The known system further comprises a control system for receiving detection data transmitted from the motion detector and which controls a performance of a tone in response to the received detection data. The state of a user's motion is detected via sensor of the motion detector and detection data representative of the detected motion state is transmitted to the control system. The control system receives the detection data from the motion detector, analyses the user's motion and then controls a tone performance, such as a musical instrument, in accordance with the analyzed data. The known system is primarily used to allow a user to participate in a tone performance, such a piece of music, in the control system. The user may for example move his hand while listening to a piece of music carried out by the control system, wherein that movement is detected and corresponding data is fed to the control system which in turn variably controls a predetermined one of tonal factors in the music piece performance. This enables an interactive performance in a piece of music, in particular inexperienced or unskilled performers.

The known system is primarily aimed at enabling a user to take part in a performance, such as a musical piece, even if the user is not sufficiently skilled. The known system detects and analyses the movements of the user and produces a response, for example in the form of a tone, in a way that eliminates the factor of the actual skill level of the user involved. The system therefore is not able to provide any information to the user of the skill level of his performance.

OBJECT OF THE INVENTION

The present invention aims to improve the known motion detection system in that the user receives feedback from the system about his movements, or more in general his movement pattern, such that the user can adapt his movement pattern to more closely correspond to a predetermined movement pattern.

SUMMARY OF THE INVENTION

In order to achieve the above-indicated aim, a motion detection system is provided that comprises a sensor arranged to detect a movement pattern of a movement occasioned by a user, and a control device arranged to receive movement data representative of the detected movement pattern. The control device is further arranged to compare the detected movement pattern data with movement pattern data representative of a predetermined movement pattern and to determine a coherence parameter representative of the coherence between the detected and the predetermined movement pattern. The control system is further arranged to control a feedback device for providing feedback to the user on the basis of the determined coherence parameter. In this way the motion detection system provides the user with feedback or information on the movements he is making and more specifically with feedback on how well he is matching the predetermined movement pattern, i.e. what the level of coherence is between the detected and predetermined movement pattern. A motion detection system that is able to provide such feedback provides the user with the possibility of adjusting his movements or movement pattern to the predetermined or desired movement pattern as the feedback is informing the user of the coherence between the user's movement pattern and the desired pattern. In particular, the inventors have realized that by providing feedback to the user on the basis of said coherence, it has become easy for the user to go through certain movement pattern that are highly rhythmic in nature. Such movement patterns are for example tai-chi exercises, playing musical instruments or certain movement patterns a user can go through to achieve a state of increased relaxation. It has been shown (see for example http://www.ncbi.nim.nih.gov/pubmed/9465340) that people suffering from Parkinson's disease may greatly benefit from using rhythmic movements, something in which the motion detection system according to the present invention can be very helpful. In an embodiment of the invention the sensor is one of an acceleration sensor, a positional sensor, a speed sensor and a gyroscopic sensor. Such sensors each provide data from which the movement pattern can be derived.

In an embodiment of the invention the sensor is an acceleration sensor and detects acceleration of the movement occasioned by the user in at least one direction. An acceleration sensor is particularly suitable to provide data on whether the movement pattern is rhythmic and/or smooth.

In an embodiment of the invention the sensor is an acceleration sensor and detects acceleration of the movement occasioned by the user in at least two directions and wherein the control device is arranged to determine an average acceleration value averaging the acceleration in said directions. This provides an increased accuracy of the detection of the movement pattern.

In an embodiment of the invention the sensor detects the movement pattern of a moveable object carried by the user. By providing an object that the user can hold the feeling of interaction by the user with the system is increased which improves the results obtained with the system of the invention.

In an embodiment of the invention the sensor is incorporated with the object, such that the sensor can very directly and very accurately detect the movement pattern occasioned by the user.

In an embodiment of the invention the control device comprises an electronic memory for storing predetermined movement pattern data. This allows reprogramming of the system and/or storing of multiple predetermined movement patterns, increasing the versatility of the system.

In an embodiment of the invention the feedback device is arranged to provide feedback to the user in the form of at least one of light, sound, vibration, temperature or any combination thereof. These forms of feedback are all easily discernable by a user and can be used to provide so-called parametric animation of the feedback, wherein a more chaotic animation is indicative of low coherence and a regular animation is indicative of a high coherence.

In an embodiment of the invention the feedback device is incorporated with the object, giving a very direct feedback to the user and enabling the motion detection system to be very mobile.

In an embodiment of the invention the feedback device is located externally from the object. This allows the feedback to be provided by an external light source for example providing an enhanced environmental experience when the system of the invention is for example used in a relaxation or meditation exercise.

In an embodiment of the invention the system further comprises communication means for wireless communication of feedback data to the feedback device, such that there does not have to be a physical connection between the control device and the feedback device, increasing the versatility of the system.

In an embodiment of the invention the system further comprises a further sensor arranged to measure physical data relating to the user, in particular the further sensor is arranged to measure at least one of a heart rhythm of the user, a body temperature of the user, a blood pressure of the user and a conductive skin impedance of the user, and wherein the control device is further arranged to receive and analyze the measured physical data and to supply feedback data based on the measured physical data to the feedback device. This improves the feedback given to the user and it is possible to further fine tune the feedback in particular when the movement pattern is part of a relaxation or meditation exercise.

In an embodiment of the invention the system further comprises at least one additional moveable object, making the system more versatile in the movement patterns that can be used with it.

In an embodiment of the invention the sensor is further arranged to collect relationship data relating to said moveable members, said relationship data containing data about at least one of a distance and a relative movement pattern between the objects, wherein the control device is further arranged control the feedback device on the basis of the relationship data. In this manner the user can be guided towards the desired usage of the two or more objects with respect to each other.

In an embodiment of the invention the feedback device comprises a number of light sources, in particular LED's, which are arranged to emit light, and/or comprises a vibration device. The use of LED's and/or vibration will provide the user with a clearly detectable feedback.

In an embodiment of the invention said objects are spherical and can be held in a palm of the user's hand and moved simultaneously by the user, wherein at least one of the objects comprises the sensor to detect a movement pattern and comprises the feedback device. This configuration allows the user to use the objects as so-called Chinese meditation balls. The inventors have discovered that the use of such meditation balls can assist in achieving a level of concentration that is required for an effective meditation. Achieving such required level of concentration and also relaxation has proven difficult in particular for novice users. Feedback on the way the user uses the meditation balls will make it easier to achieve the required concentration and relaxation. Furthermore, using the meditation balls according to the invention, the user will experience assistance in controlling his breathing and heart rate as well as improving the dexterity of his fingers.

In an embodiment of the invention both spherical objects comprise a number of light sources, in particular LED's, which are arranged to emit light, and/or comprise a vibration device, such that a direct form of feedback is provided for the user.

In an embodiment of the invention at least one of said spherical objects is provided with actuation means arranged to act upon the at least one further spherical object under control of the control device. This can create additional movement of the objects so that it is possible to specifically train the dexterity and/or feeling of balance of the user's hands. Such actuation means may comprise gyroscopic devices or magnetic devices that are arranged such that they influence the other object.

In an embodiment of the invention the sensor, the control device and the feedback device operate real-time, so that the user gets direct feedback on the movement pattern.

BRIEF DESCRIPTION OF THE DRAWINGS

Further advantageous embodiments of the motion detection system according to the invention are described in the claims and in the following description with reference to the drawings, in which:

DETAILED DESCRIPTION OF EXAMPLES

Figure 1:
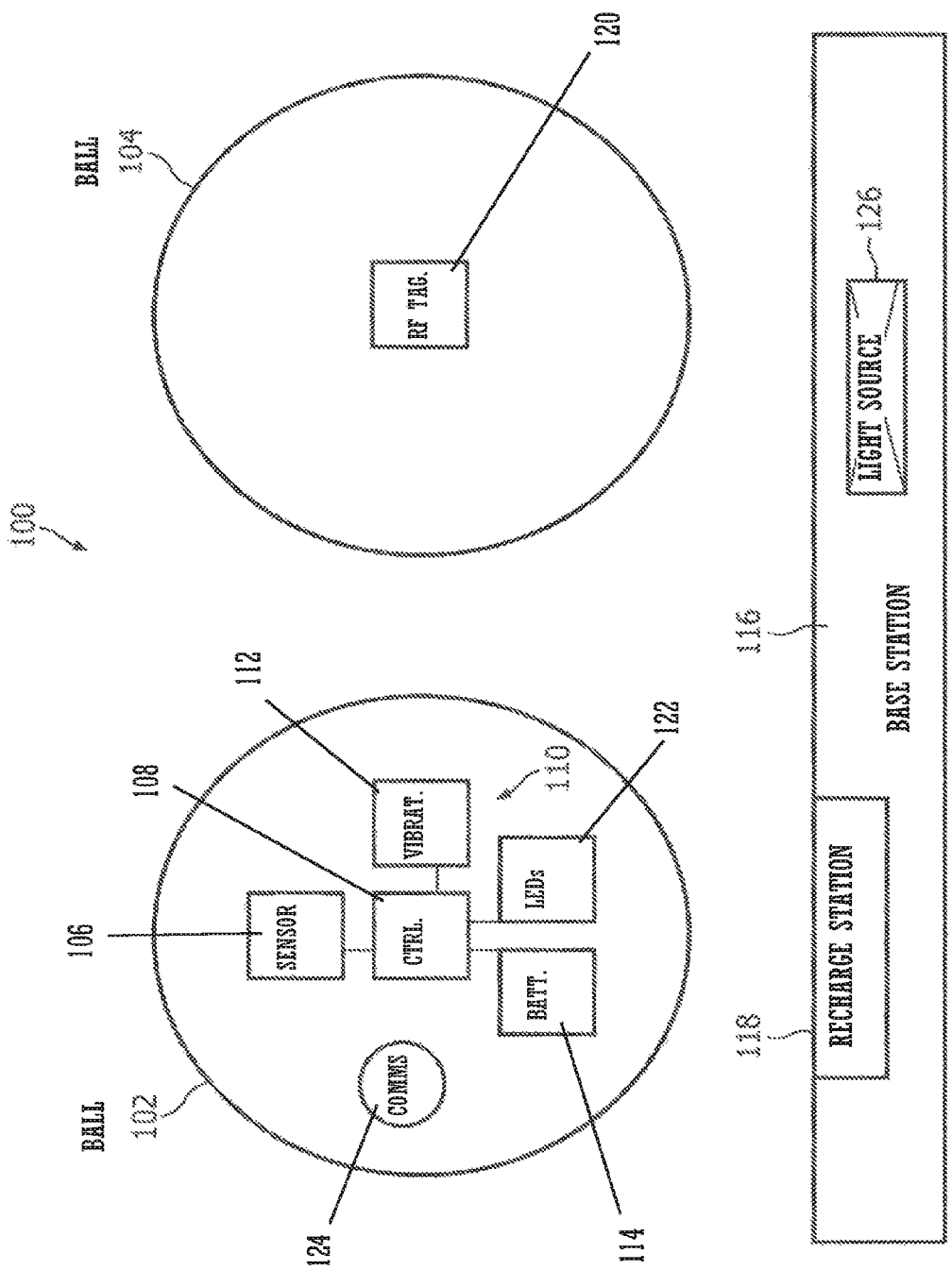
FIG. 1 schematically shows a motion detection system according to a first embodiment of the invention.

FIG. 1 shows a first schematically depicted embodiment of a motion detection system 100 according to the present invention. The invention embodied in the first embodiment of FIG. 1, will be explained using the example that the motion detection system 100 is a meditation assistance device that helps with controlling breathing and heart rate as well as improving the dexterity of the fingers of a user that uses the system according to the invention. More in particular in the example of FIG. 1 the system or device 100 is based on the use of two spherical objects, so-called Chinese meditation balls. Hence the system 100 comprises a first object or first ball 102 and a second object or second ball 104.

The user can hold both balls 102, 104 in one hand and use his fingers to move the balls 102, 104 such that they rotate around an imaginary axis that is substantially perpendicular to the palm of the user's hand. This is similar to the typical exercise with the traditional Chinese meditation balls. It is well-known that through the repeated movement pattern of the rotating balls 102, 104 the user is helped to achieve the concentration needed for an effective meditation. Furthermore, by using the meditation balls a certain state of relaxation can be achieved in which the user experiences a reduced heart rate and a more relaxed breathing rhythm. In order to improve the effectiveness of ordinary meditation balls, the balls 102, 104 are part of the motion detection system 100.

The motion detection system 100 comprises a sensor 106 that is arranged to detect a movement or movement pattern occasioned by the user. In the example of FIG. 1, the sensor 106 is provided in the ball 102 and can directly detect any movement to which the ball 102 is subjected. The sensor 106 can for example be an acceleration detector that may detect acceleration in one, two or more directions. The larger the number of directions the acceleration sensor can cover, the more accurate the detection of the movement pattern will be. In the context of the example of FIG. 1, the term movement pattern means the mutual rotating movement of the meditation balls 102,104. Other types of sensors are also possible, such as positional sensors or speed sensors. It is noted here that it is also possible to provide sensors that are located outside of the ball 102 that can detect the movement pattern thereof. In such as case the ball 102 would for example be provided with a RFID tag such that the sensor can pick up the signal from the RFID tag.

The motion detection system 100 further comprises a control device 108, such as a microprocessor, that is arranged to receive movement data representative of the detected movement pattern. The control device 108 is provided with an electronic memory which is used to store predetermined movement patterns. Such predetermined movement patterns are for example relaxation patterns that can be performed with the balls 102, 104 in order for the user to achieve a certain state of relaxation or concentration. The control device 108 is further arranged to compare the detected movement pattern data with movement pattern data representative of the predetermined movement pattern and to determine a coherence parameter representative of the coherence between the detected and the predetermined movement pattern. The greater the coherence between the detected movement pattern and the predetermined movement pattern is, the better the user is performing the desired movement pattern. Based on the coherence parameter the control device 108 is further arranged to control a feedback device 110 that can provide feedback informing the user on how he is doing with respects to his efforts to copy the desired movement pattern. The feedback device 110 may give feedback in a manner that can be sensed by the user, for example in the form of light, sound, vibration, temperature or any combination thereof to which effect appropriate emitters can be provided.

In the example of FIG. 1, the user who is rotating the balls 102, 104 may achieve a certain state of relaxation in which his heart rate as an example will be reduced and more constant when the balls are being rotated in a continuous manner. His efforts in achieving that continuous movement pattern of the balls 102, 104 will de detected by the sensor 106 and compared with a desired (predetermined) movement pattern by the control means 108. At first the movement pattern will be different from the desired pattern, and the feedback will be chaotic and irregular. This will inform the user that he is not coherent with the desired pattern. When the movement pattern occasioned by the user is matching the desired movement pattern, the feedback will be more structured and regular.

When for example feedback in the form of vibration is used, the feedback device 110 comprises a vibrator 112 for example of a type commonly used in mobile phones. The sensation of the vibration will guide the user to the desired movement pattern, wherein a rhythmic vibration pattern indicates close correspondence with the predetermined movement pattern. A preferred way of giving feedback to the user is by means of light, whereby the ball 102 is for example provided with a number of LED's 122 that are visible from the outside when activated. The LED's are activated under control of the control device 108 and similarly as mentioned above can produce a lighting pattern that is indicative of how closely the user's movements match the desired movement patterns.

It is noted here, that in order to be able to operate, the ball 102 is provided with a battery 114, preferably a rechargeable battery. Furthermore there is provided a base station 116 comprising a housing with a recharging station 118 that serves as a stand or container for the exercise balls 102, 104 when these are not in use. When finished, the user simply puts the balls 102, 104 onto the recharging station 118 and the balls will be recharged automatically for the next use.

In an alternative embodiment the sensor 106 may be further arranged to sense aspects of the relationship between the first ball 102 and the second ball 104. In other words, to collect relationship data relating to the objects. The control device 108 is arranged control the feedback device 110 also on the basis of the relationship data.

The relationship between the first ball 102 and the second ball 104 may be sensed for example by utilizing the sensor 106 in the first ball or an additional dedicated sensor and an RFID tag 120 in the second ball. In that manner relationship data such as respective distance, rotational speed, as well as the consistency of any relative movement of the balls with respect to each other may be detected. This information may then be used by the control device 108 to control the feedback device 110, in such a way as to guide the user towards a desired path of usage of both balls.

In yet a further embodiment according to the invention the motion detection device 100, and in the example of FIG. 1 the ball 102 is provided with a communication device 124 such as a radio, that is arranged to communicate data about the use of the balls to an external device such as for example a light source 126, that is provided with suitable receiving equipment, and that could control the light environment of the user so as to provide an enhanced environmental experience when using the motion detection system 100. In the example of FIG. 1 the external device is the base station 116 which comprises the light source 126. Further it is also possible that the external device is a sound system comprising for example personal devices such as a headphone.

Furthermore this embodiment could also be utilized as training equipment where an experienced person or teacher would use the meditation balls or other objects to create a controlled environmental experience for others to follow. The meditation balls of the other users might give individual feedback on their performance with respect to the teachers' performance, and group experience could be enhanced.

In yet another embodiment of the invention the second meditation ball 104 could also be provided with a feedback device of similar design as the feedback device of the first ball 102, whereby the feedback device of the second ball 104 is also under control of the control device 108. In this manner the pattern or animation in the feedback where LED's are for example used can be formed by the patterns of light emitted by both meditation balls 102, 104. Again, a regular pattern would indicate a high coherence between the detected movement pattern and the predetermined movement pattern.

In addition to what is described above, the sensor could be further arranged or an additional sensor could be provided to measure (vital) body signals of the user. In particular such sensor is arranged to measure at least one of a heart rhythm of the user, a body temperature of the user, a blood pressure of the user and a conductive skin impedance of the user. The data measured by the sensor can be supplied to the control device which analyzes the measured physical data and to supplies feedback data based on the measured physical data to the feedback device to fine-tune the feedback that the user receives.

In an even further embodiment of the system according to the present invention, attenuators could be embedded in the exercise balls that could create some kind of movement of the balls so as to specifically train the dexterity or feeling of balance of the user's hands. Those attenuators could include, for example gyroscopic devices, or magnetic devices that may serve for one exercise ball to influence the other one.

Figure 2:
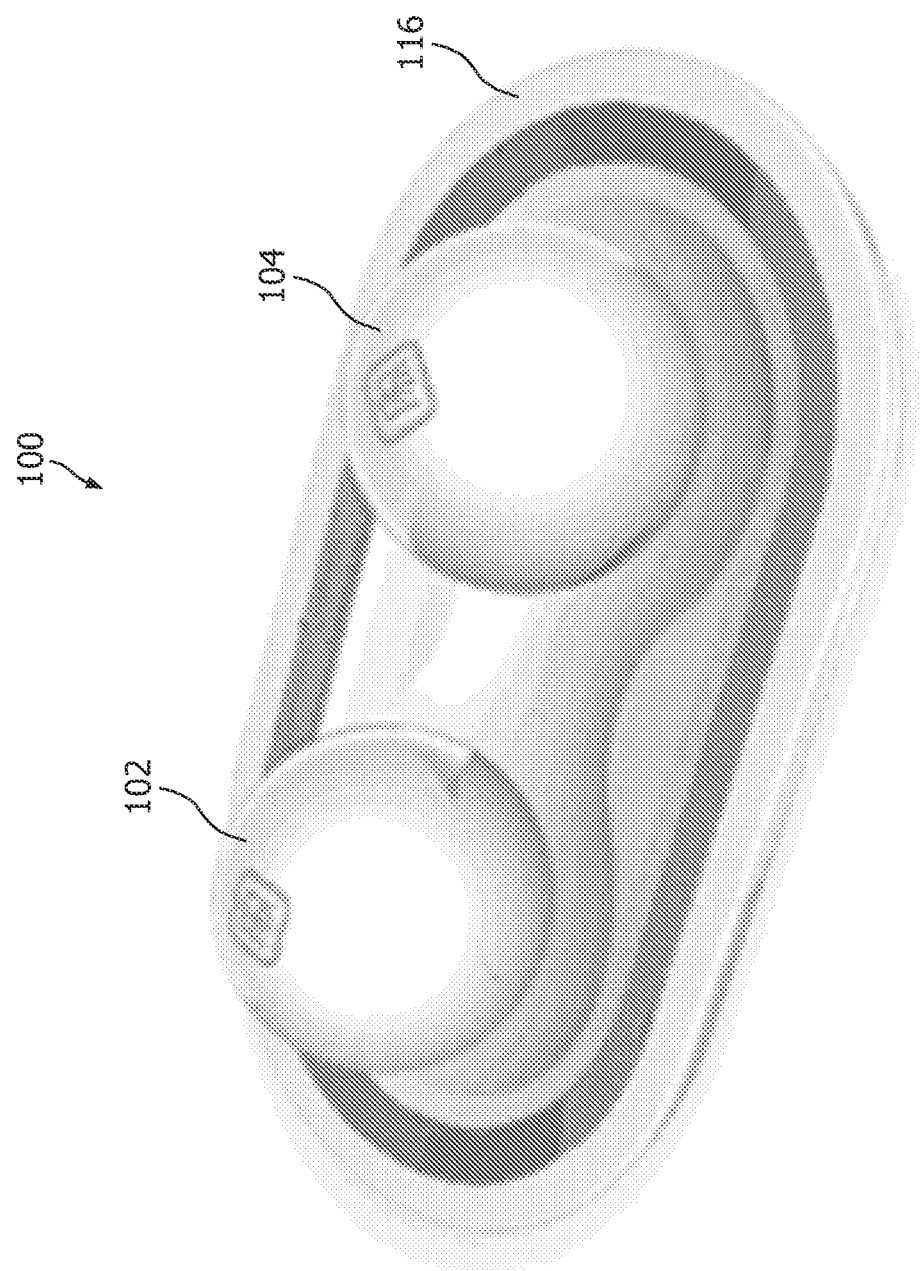
FIG. 2 shows an artist's impression of the motion detection system comprising meditation balls placed on a base station.

An artist's impression of the motion detection device 100 is given with reference to FIG. 2, wherein it can be seen that the first meditation ball 102 and the second meditation ball 140 are placed on the base station 116.

As an alternative to the above, which alternative is not further shown in the figures, it is proposed to use the embodiment comprising a vibrator in an alternative manner. Before using the meditation balls, the user would take a deep breath, exhale slowly while pressing on a reset button provided on the base station until the end of the exhalation to start a new use cycle. The duration of the exhalation is registered by the control device via the sensor and a timer. The user would then pick up the two exercise balls and those would start to vibrate in a repeating cycle by utilizing the vibrator. The magnitude of the vibration goes up softly until it reaches its peak value and will then reduce softly. The time duration for each complete cycle is equally to one or two times of the exhalation time previously registered. The sensation of the vibration and the rhythm create a soothing effect and softly guide the user to repeat the deep breath in a rhythmic manner. Through the repeated breathing and the focus on the vibration cycles, the user is helped to achieve the concentration needed for an effective meditation. One of the advantages of the soft vibrating cycle is that it is not critical where the user want to start, as long as the user registers a starting point and keeps to it consistently.

The present invention has heretofore been described by means of the example wherein the motion detection system comprises meditation balls as objects that are submitted to a certain movement pattern by the user of the system. It is to be understood that this example is by no means meant to limit the scope of the invention. In fact, the inventive concept underlying the invention can be used in a much broader way than only the example presented.

In general the detection of movement patterns occasioned by a user and the provision of feedback to the user on the level of coherence between those movement patterns and desired movement patterns can be employed in many fields. Such fields are for example performance arts like music and dance, tai chi and yoga and even martial arts. Also the application in sports is envisaged, where movements of for example rackets etc. can be detected and compared with desired patterns. In all given fields movement patterns should be performed in a certain desired manner and direct feedback on how a user is performing will greatly benefit that user in improving his skills.

The invention claimed is:

1. A motion detection system, comprising:
   a sensor arranged to:
      detect a movement of a moveable object configured and dimensioned for being held by a user's hand, and
      sense aspects of a relationship between the moveable object and at least one additional moveable object configured and dimensioned for being held by the user's hand, wherein the moveable object and the at least one additional moveable object are rotable about an axis perpendicular to the users hand; and
   a control device positioned on or within the moveable object, the control device arranged to:
      receive movement data representative of the detected movement;
      formulate a movement pattern of the moveable object based on the received movement data;
      compare the formulated movement pattern with a plurality of predetermined movement patterns;
      determine which of said plurality of predetermined movement patterns matches the formulated movement pattern;
      determine a coherence parameter representative of the coherence between the formulated movement pattern and the matching one of the plurality of predetermined movement patterns; and
      control a feedback device, providing feedback to the user on the basis of the determined coherence parameter, said control device storing said plurality of predetermined movement patterns, wherein said predetermined movement patterns comprising: relaxation patterns that can be performed with the moveable objects in order for the user to achieve a state of relaxation or concentration.

2. The system according to claim 1, wherein the sensor is one of: an acceleration sensor, a positional sensor, a speed sensor and a gyroscopic sensor.

3. The system according to claim 2, wherein the sensor is an acceleration sensor and detects acceleration of the movement occasioned by the user in at least one direction.

4. The system according to claim 2, wherein the sensor is an acceleration sensor and detects acceleration of the movement occasioned by the user in at least two directions and wherein the control device is arranged to determine an average acceleration value averaging the acceleration in said directions.

5. The system according to claim 1, wherein the sensor is incorporated within the object.

6. The system according to claim 1, wherein the control device comprises:
   an electronic memory for storing the predetermined movement patterns.

7. The system according to claim 1, wherein the feedback device is arranged to provide feedback in the form of at least one of: a light, a sound, a vibration, a temperature and a combination thereof.

8. The system according to claim 1, further comprising:
   communication means for wirelessly communicating feedback data to the feedback device.

9. The system according to claim. 1, comprising:
   a further sensor arranged to:
      measure physical data relating to the user, said physical data representing at least one of a heart rhythm of the user, a body temperature of the user, a blood pressure of the user and a conductive skin impedance of the user, and wherein the control device is further arranged to:
   receive and analyze the measured physical data and to supply feedback data based on the measured physical data to the feedback device.

10. The system according to claim 1, wherein the sensor is further arranged to:
   collect relationship data relating to said moveable object and said at least one additional moveable object, said relationship data containing data about at least one of a distance and a relative movement pattern between the moveable object and said at least one additional moveable object, wherein the control device is further arranged to:
      control the feedback device on the basis of the relationship data.

11. The system according to claim 1, wherein said movable objects are spherical and can be held in a palm of the user's hand and moved simultaneously by the user, wherein at least one of the objects comprises the sensor and the feedback device.

12. The system according to claim 1, wherein the feedback device comprises a number of light sources arranged to emit light.

13. The system according to claim 1, wherein said movable objects comprise a number of light sources arranged to emit light.

14. The system according to claim 11, wherein said at least one of said movable objects is provided with an electrical power source.

15. The system according to claim 11, wherein at least one of said movable objects comprises actuation means arranged to act upon the at least one further movable object under control of the control device.

16. The system according to claim 11, wherein the sensor, the control device and the feedback device operate in real-time.

17. The system according to claim 11, wherein the feedback device comprises a vibration device.

18. The system according to claim 12, wherein both moveable objects comprise a vibration device.

19. The system according to claim 14, wherein said electrical power source is a rechargeable electrical power source.

20. The system according to claim 15, wherein said actuation means comprises at least one of a gyroscopic and magnetic device.

* * * * *